(No Model.) 2 Sheets—Sheet 1.

F. STUBBS.
MAGAZINE CAMERA.

No. 573,309. Patented Dec. 15, 1896.

Witnesses

Inventor
Frederic Stubbs
by Bakewell & Bakewell
his Attorneys (No Model.) 2 Sheets—Sheet 2.
F. STUBBS.
MAGAZINE CAMERA.

No. 573,309. Patented Dec. 15, 1896.

Witnesses
Inventor
Frederic Stubbs
by Bakewell & Bakewell
his Attorneys.

THE NORRIS PETERS CO., PHOTO-LITHO., WASHINGTON, D. C.

UNITED STATES PATENT OFFICE.

FREDERIC STUBBS, OF SHEFFIELD, ENGLAND.

MAGAZINE-CAMERA.

SPECIFICATION forming part of Letters Patent No. 573,309, dated December 15, 1896.

Application filed February 1, 1896. Serial No. 577,722. (No model.)

*To all whom it may concern:*

Be it known that I, FREDERIC STUBBS, a citizen of England, residing at Edge Gate, Osborne Road, Sheffield, in the county of York, England, have invented a new and useful Improvement in Photographic Cameras, of which the following is a specification.

My invention relates to a construction of photographic camera with a chamber containing a number of plates and provided with means whereby I can bring any one of these plates into the exposure-chamber and withdraw it therefrom. For this purpose I construct the camera as I shall describe, referring to the accompanying drawings.

Figure 1:
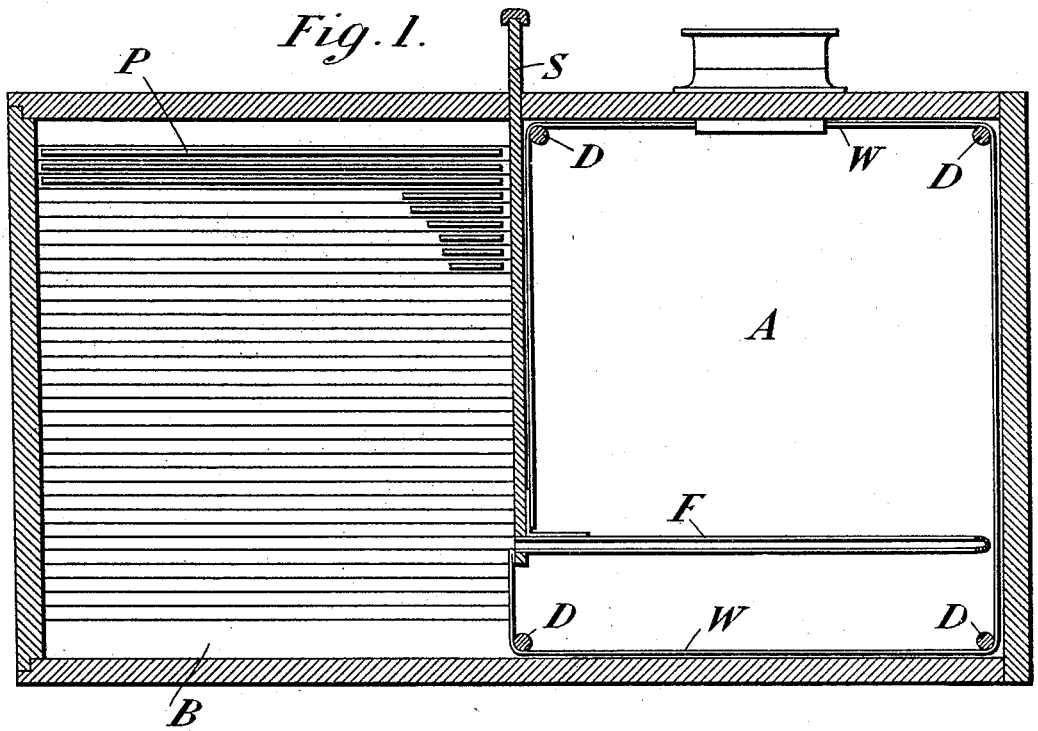
Figure 3:
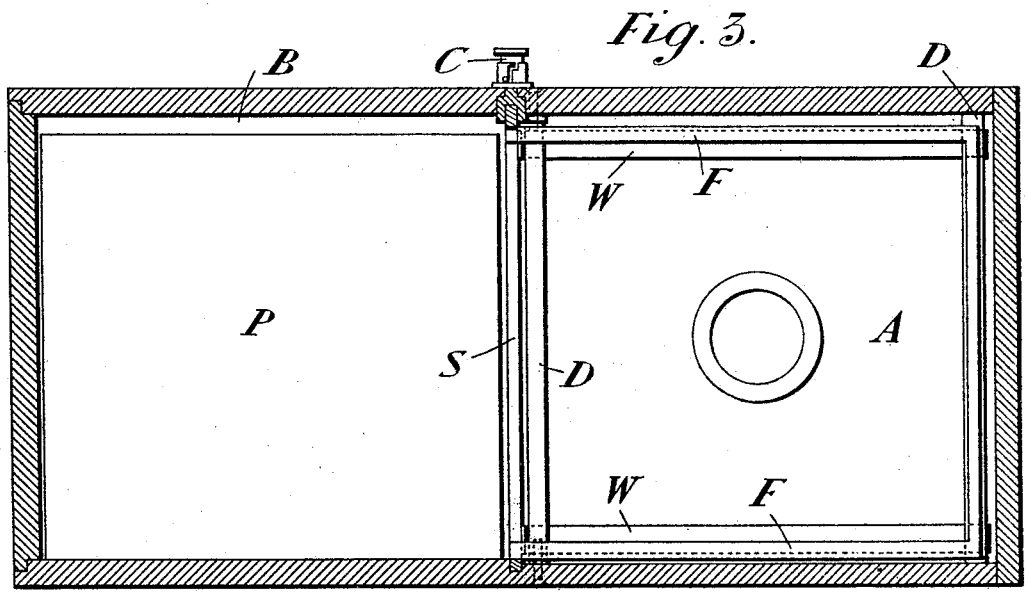
Figure 2:
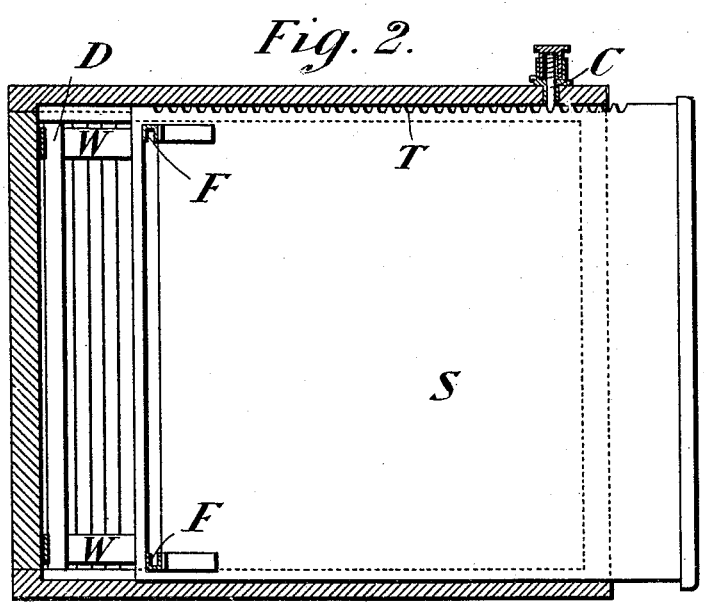

Figure 1 is a sectional plan. Fig. 2 is a transverse section, and Fig. 3 is a longitudinal section.

At the side of the exposure-chamber A, I make a chamber B of substantially the same dimensions, in which I place the plates P side by side, but separated by thin partitions.

In the exposure-chamber A, I provide a frame F of such size as can receive any one of the plates P, and having its face open and also one side open, which is presented toward the plate-chamber B. To the frame is connected a slide S, which projects outward through the front of the camera in a plane at right angles to that of the plates P.

The slide S is preferably graduated to show the position of the plate selected, and also provided with rack-teeth T, which are engaged by a spring-pin C, so as to hold the slide in position while the frame F is receiving or delivering a plate.

The slide S has attached to it a flexible web W, or it might be a pair of flexible strips, which pass around guide-pulleys D at the angles of the exposure-chamber, so that when the frame is moved to face one of the plate-compartments the web or strips, passing over the mouths of the compartments which are behind the frame, prevent plates from issuing from them when the camera is inclined, the slide and web or strips covering the mouths of all the compartments except that which faces the lateral opening of the frame F.

When it is desired to expose a plate, a slide S is moved to such position that the mouth of the frame F is in front of the particular plate selected, and then by inclining the camera the plate slides into the frame F, which by means of the slide S is moved into focal position. After the photograph is taken these operations are repeated in reverse order, the plate thus being restored to its original place.

Having thus described the nature of my invention and the best means I know for carrying the same into practical effect, what I claim is—

1. A camera having a magazine-chamber for containing the plates at one side of the exposure-chamber, a slide arranged to move between the two chambers in a plane at right angles to that of the plates and having a projecting handle, a plate-frame secured to said slide and arranged to be brought in line with any of the plates in the magazine-chamber, and a flexible stop actuated by the slide and arranged to retain all the plates in position, except the one entering the plate-frame; substantially as described.

2. A camera having a magazine-chamber for containing the plates at one side of the exposure-chamber, a slide arranged to move between the two chambers in a plane at right angles to that of the plates, a frame adapted to contain one or more of said plates, secured to said slide and arranged to be brought in line with any of the plates in the magazine-chamber, and a flexible stop actuated by the slide and arranged to retain all the plates in position except the one entering the plate-frame; substantially as described.

3. A camera having a magazine-chamber for containing the plates at one side of the exposure-chamber, a slide arranged to move between the two chambers in a plane at right angles to that of the plates, a plate-frame secured to said slide and arranged to be brought in line with any of the plates in the magazine-chamber, and a flexible stop composed of a web or strip having its ends attached to the slide or to the plate-frame on opposite sides of said frame, said stop being actuated by the slide and arranged to retain all the plates in position except the one entering the plate-frame; substantially as described.

4. A camera having a partitioned magazine-chamber for containing the plates at one side of the exposure-chamber, a slide arranged to move between the two chambers in a plane at right angles to that of the plates, a plate-frame secured to said slide and arranged to be brought in line with any of the plates in the magazine-chamber, and a flexible stop actuated by the slide and arranged to retain all the plates in position except the one entering the plate-frame; substantially as described.

5. In a camera having a magazine-chamber for containing the plates at one side of the exposure-chamber, a slide provided with rack-teeth, arranged to move between the two chambers in a plane at right angles to that of the plates, a plate-frame secured to said slide and arranged to be brought in line with any of the plates in the magazine-chamber, and a retaining-pin for engaging said rack-teeth and holding the slide in a determined position; substantially as described.

In testimony whereof I have signed my name to this specification, in the presence of two subscribing witnesses, this 15th day of January, A. D. 1896.

FREDRC. STUBBS.

Witnesses:
C. B. HOBBIS,
JAMES E. M. EASTWOOD.